United States Patent
Ham et al.

(10) Patent No.: US 8,928,553 B2
(45) Date of Patent: Jan. 6, 2015

(54) METHOD AND APPARATUS FOR ACCESSING DEVICE BASED ON INTUITIVE SELECTION

(75) Inventors: Seong-Il Ham, Yongin-si (KR); Young-Ki Kim, Seoul (KR); Jin-Hyoung Kim, Hwaseong-si (KR); Shin-Il Kang, Suwon-si (KR); Jin-Wook Lee, Yongin-si (KR); Hyung-Jun Daniel Park, Suwon-si (KR); Yang-Un Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 138 days.

(21) Appl. No.: 13/273,996

(22) Filed: Oct. 14, 2011

(65) Prior Publication Data

US 2012/0092235 A1 Apr. 19, 2012

(30) Foreign Application Priority Data

Oct. 15, 2010 (KR) .................. 10-2010-0101037

(51) Int. Cl.
*G09G 5/00* (2006.01)
*H04N 21/41* (2011.01)
*G06F 3/14* (2006.01)

(52) U.S. Cl.
CPC .......... *H04N 21/4122* (2013.01); *G06F 3/1438* (2013.01)
USPC ....................................................... 345/1.3

(58) Field of Classification Search
CPC combination set(s) only.
See application file for complete search history.

(56) References Cited

U.S. PATENT DOCUMENTS

| | | | |
|---|---|---|---|
| 5,682,486 A | 10/1997 | Grossman et al. | |
| 7,895,269 B2 | 2/2011 | Ikeda | |
| 2004/0125044 A1 | 7/2004 | Suzuki | |
| 2006/0092466 A1 | 5/2006 | Ikeda | |
| 2011/0069043 A1* | 3/2011 | Lee et al. | 345/204 |
| 2011/0074667 A1* | 3/2011 | Robinson | 345/156 |
| 2012/0050310 A1* | 3/2012 | Patel et al. | 345/593 |

FOREIGN PATENT DOCUMENTS

| | | |
|---|---|---|
| KR | 1020070015724 A | 2/2007 |
| KR | 1020070061620 A | 6/2007 |
| KR | 10-2009-0121069 | 11/2009 |
| KR | 1020100026811 A | 3/2010 |
| KR | 1020100080292 A | 7/2010 |

OTHER PUBLICATIONS

Notification of Transmittal of the International Search Report and the Written Opinion of the International Searching Authority, or the Declaration dated Apr. 18, 2012 in connection with International Patent Application No. PCT/KR2011/007645.
Australian Examination Report dated Mar. 6, 2014 in connection with Australian Patent Application No. 2011314469, 3 pages.
Extended European Search Report dated Oct. 6, 2014 in connection with European Application No. 11832772.5; 7 pages.

* cited by examiner

*Primary Examiner* — Van Chow (57) ABSTRACT

A method and apparatus of a first device for selecting at least one of a plurality of second devices to be accessed. The method includes transmitting pieces of media data to the corresponding plurality of second devices one-to-one, and determining at least one of the plurality of second devices to be accessed by the first device according to a user's selection on the basis of the pieces of media data being reproduced by both the first device and each of the plurality of second devices.

19 Claims, 8 Drawing Sheets

METHOD AND APPARATUS FOR ACCESSING DEVICE BASED ON INTUITIVE SELECTION

CROSS-REFERENCE TO RELATED APPLICATION(S) AND CLAIM OF PRIORITY

The present application is related to and claims the benefit of Korean Patent Application No. 10-2010-0101037, filed on Oct. 15, 2010, in the Korean Intellectual Property Office, the disclosure of which is incorporated herein in its entirety by reference.

TECHNICAL FIELD

One or more aspects of the present disclosure relate to methods and apparatuses of a first device for accessing other devices, and more particularly, to a method and apparatus of a first device for selecting and accessing at least one device from among a plurality of second devices.

BACKGROUND

As convergence between devices of one kind or different kinds has become brisk, a variety of methods and apparatuses have been developed for allowing easier connection or access between the devices.

In circumstances where various services are provided via a network to which various devices are connected, a user needs to select a desired service or device for use more exactly and quickly.

SUMMARY

To address the above-discussed deficiencies of the prior art, it is a primary object to provide a method and apparatus of a first device for selecting and accessing at least one device from among a plurality of second devices, and a computer-readable storage medium having a program embodied thereon for carrying out the method.

According to an aspect of the present disclosure, there is provided a method associated with a first device for accessing at least one of a plurality of second devices connected to the first device. The method includes reproducing in the first device pieces of media data, each piece corresponding to one of the plurality of second devices. The method also includes transmitting the pieces of media data to the corresponding plurality of second devices. The method further includes determining at least one of the plurality of second devices to be accessed by the first device according to a user's selection on the basis of the pieces of media data being reproduced by both the first device and each of the plurality of second devices. The method still further includes accessing the determined at least one of the plurality of second devices.

The pieces of media data may include a plurality of images that each correspond to one of the plurality of second devices.

The reproducing in the first device may include displaying the plurality of images that each correspond to one of the plurality of second devices on a screen of the first device as thumbnail images.

The pieces of media data may include a plurality of sounds or text images each corresponding to one of the plurality of second devices.

The reproducing in the first device may include mapping the pieces of media data stored in the first device to the plurality of the second devices one-to-one, and reproducing in the first device the pieces of media data stored in the first device.

The reproducing in the first device may include mapping the pieces of media data received from an external device to the plurality of the second devices one-to-one, and reproducing in the first device the pieces of media data received from the external device.

The reproducing in the first may include reproducing the pieces of media data one-by-one in a predetermined order, wherein the plurality of second devices reproduce the pieces of media data in the predetermined order.

According to another aspect of the present disclosure, there is provided an accessing apparatus of a first device for accessing a plurality of second devices connected to the first device. The apparatus includes a reproducing unit configured to reproduce in the first device pieces of media data, each piece corresponding to one of the plurality of second devices. The apparatus also includes a network interface unit configured to transmit the pieces of media data to the corresponding plurality of second devices. The apparatus further includes a controller configured to determine at least one of the plurality of second devices to be accessed by the first device according to a user's selection on the basis of the pieces of media data being reproduced by both the first device and each of the plurality of second devices, and access the determined at least one of the plurality of second devices.

According to another aspect of the present disclosure, there is provided a accessing method of a first device. The method includes retrieving at least one second device accessible to the first device. The method also includes displaying the retrieved at least one second device on a screen of the first device. The method further includes selecting at least one of the second devices. The method still further includes outputting a predetermined identifier to the selected at least one device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

Figure 1:
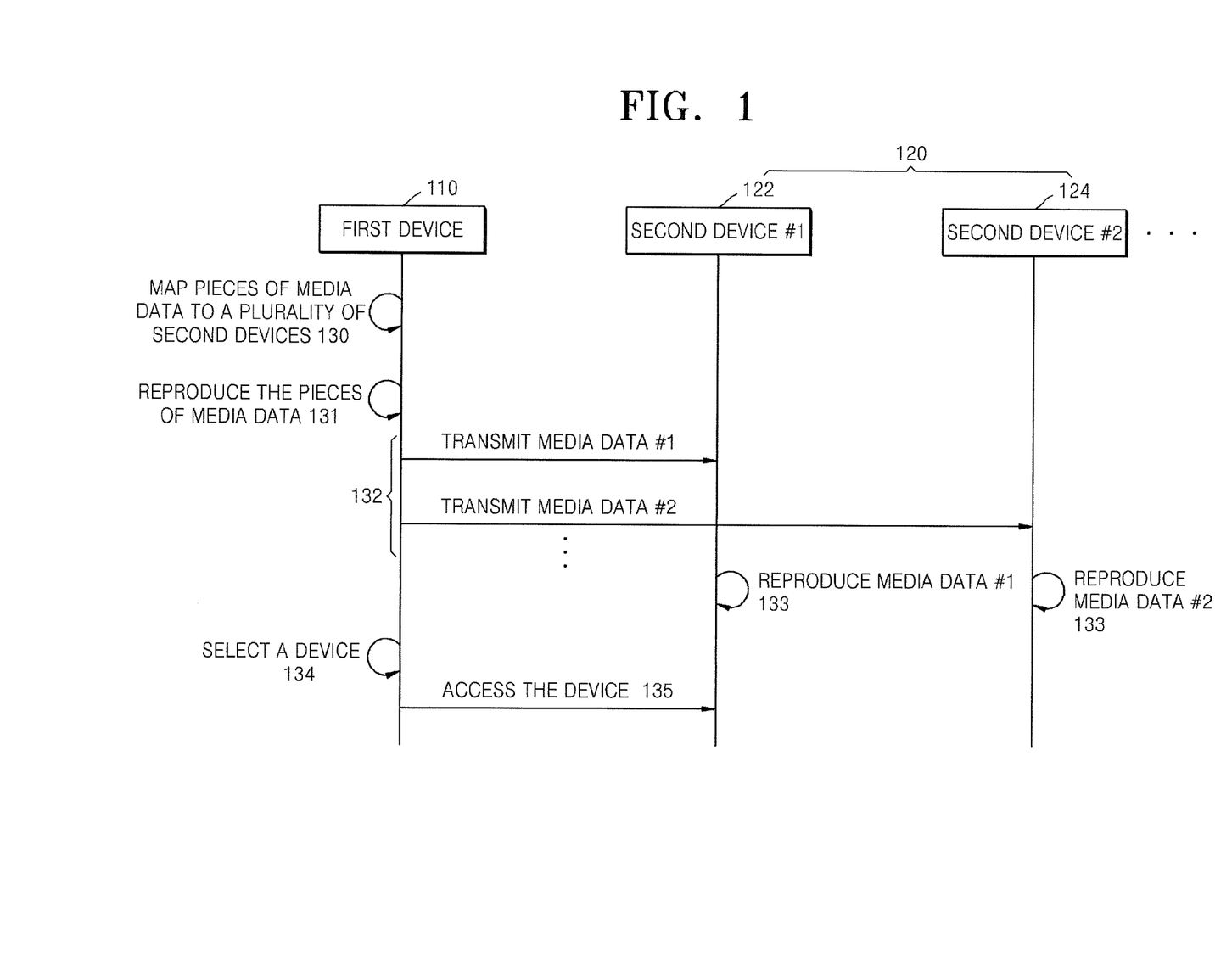
FIG. 1 is a flowchart of a method of a first device for accessing at least one second device, according to an embodiment of the present disclosure.

FIG. 1 is a flowchart of a method of a first device 110 for accessing at least one second device 120, according to an embodiment of the present disclosure. In FIG. 1, how the first device 110 selects and accesses the at least one second device 120 is shown.

Prior to accessing any device, the first device 110 retrieves a plurality of second devices 120 to which the first device 110 is connected via a network and establishes a network connection therewith. When a device is connected to a Universal Plug and Play (UPnP) network, for example, the network assigns an Internet Protocol (IP) address to the device and a Control Point discovers the connected device. When the discovery is completed, the Control Point multicasts a device description and/or a service description of the device to other devices, based on which the other devices may access the newly connected device. Digital Living Network Association (DLNA), which is based on the UPnP network, also operates the same when it comes to establishing a network connection to a newly connected device. Although the UPnP network is an example, it is obvious to one of ordinary skill in the art that there may be a variety of automatic or passive ways of establishing a network connection between devices in many different networks than the UPnP network.

When the network connection is completed, the first device 110 may use services provided by the second devices 120 or may provide a certain service for the second devices 120. In this situation, the first device 110 makes network connections to all devices accessible to the first device 110, and in order to use or provide any service, the first device 110 selects a specific device from among the second devices 120 that are connected to the first device 110 via a network.

For example, when a user wishes to view some photos on a television, which are stored in the first device 110 that corresponds to a mobile device and a plurality of televisions corresponding to the second devices 120 are connected to the first device 110 via a network, the mobile device selects a television from among the plurality of televisions for displaying the photos unless the user wants to view the photos through all the televisions at the same time. In other words, the mobile device selects a television to be accessed for using such a photo display service.

Among many different ways of selecting a device, there is one that selects a device based on specific information of the second devices 120, according to a conventional art. Based on serial numbers, proper names, identities (e.g., Universally Unique ID (UUID)), IP addresses, Media Access Control (MAC) addresses, etc., of the second devices 120, the first device 110 may select a device from among the second devices 120. For example, if such unique information of the second devices 120 connected to the first device 110 via a network is displayed on a screen of the first device 110, the user may select any of the second devices 120 based on the specific information.

Such a method of selecting a device, however, is not easily implemented by a user who has no knowledge about network connections among the devices. In this situation, the user may have trouble identifying specific information one on one to match the specific information with the second devices 120. Accordingly, an embodiment of the present disclosure is a method of intuitively selecting a device even for users who have no knowledge about network connections, which will be described in detail with reference to FIG. 1.

Referring to FIG. 1, the first device 110 maps pieces of media data to a plurality of the second devices 120, in operation 130. Media data such as images or text may be conveyed to users through a screen of a device, while media data such as sounds may be conveyed to users through a speaker of a device. Since the media data is delivered to users intuitively, the embodiment of the present disclosure uses the media data to perform an intuitive selection. To do this, the first device 110 maps a plurality of different media data to the second devices 120 one-to-one, in operation 130.

The first device 110 may receive the pieces of media data from an external device or may currently store the pieces of media data therein, for mapping in operation 130.

Here, images, text, and sounds will be taken as an example of the pieces of media data, but one of ordinary skill in the art would know that all other media data that can be perceived with the users' senses can also be applied to the embodiment of the disclosure.

In operation 131, the first device 110 reproduces the pieces of media data that have been used for mapping in operation 130. A plurality of images that have each been mapped to one of the second devices 120 may be displayed on the screen of the first device 110, or a plurality of texts may be displayed on the screen. Further, a plurality of sounds that have each been mapped to one of the second devices 120 may be reproduced.

If the pieces of media data are images or texts, the first device 110 may arrange and display the images or texts on its screen in the form of thumbnails that may be selected through any input device (e.g., a keyboard, a mouse, a touch pad, and the like). If the pieces of media data are sounds, the first device 110 may display a plurality of selection items each corresponding to one of the sounds on its screen.

The first device 110 reproduces the pieces of media data all at once or one-by-one in a predetermined order. The first device 110 may display the pieces of media data each corresponding to one of the second devices 120 on its screen, altogether or one at a time. In one aspect of operation, when the pieces of media data are sounds, the first device 110 may reproduce the pieces of media data one-by-one in an order rather than simultaneously, because, in the latter case, the user may not tell which sound is mapped to which second device 120.

In operation 132, the first device 110 transmits the pieces of media data to corresponding second devices 120 based on the mapping performed in operation 130.

For example, when the first device 110 maps media data #1 to a second device #1 122 in operation 130, it transmits the media data #1 to the second device #1 122 in operation 132. When the first device 110 maps media data #2 to a second device #2 124 in operation 130, it transmits the media data #2 to the second device #2 124 in operation 132.

In operation 133, the plurality of second devices 120 each reproduce the media data received from the first device 110.

For example, the second device #1 122 having received the media data #1 from the first device 110 reproduces the media data #1, and the second device #2 122 having received the media data #2 from the first device 110 reproduces the media data #2. The media data that are images or text are displayed on screens of the second devices 120, while the media data that are sounds are reproduced acoustically in the second devices 120.

In operation 134, the first device 110 selects at least one of the second devices 120 to be accessed. The selection is made based on the pieces of media data being reproduced by the first device, as in operation 131, and the pieces of media data being reproduced by the second devices 120, as in operation 133. Because the same media data as the pieces of media data being reproduced by the first device 110 are each reproduced by the second devices 120, the user of the first device 110 may select one of the second devices 120 by comparing the media data being reproduced by the first device 110 to the media data being reproduced by the second devices 120.

The user of the first device 110 may compare images or texts being displayed on the screen of the first device 110 with those being displayed on a screen of one of the second devices 120 to select a device to be accessed. When selecting the second device #1 122, for example, the user of the first device 110 may choose an image or text being displayed on the screen of the first device 110, the image being identical to an image or text being displayed on the screen of the second device #1 122, in order to select the second device #1 122 to be accessed.

In addition, the user of the first device 110 may compare sounds being reproduced in the first device 110 with sounds being reproduced in one of the second devices 120 to select a device to be accessed. When selecting the second device #2 124, for example, the user of the first device 110 may choose a sound item in the first device 110, the sound item corresponding to a sound being reproduced in the second device #2 124. A more detailed description thereof is made with reference to FIGS. 2-4.

Figure 2:
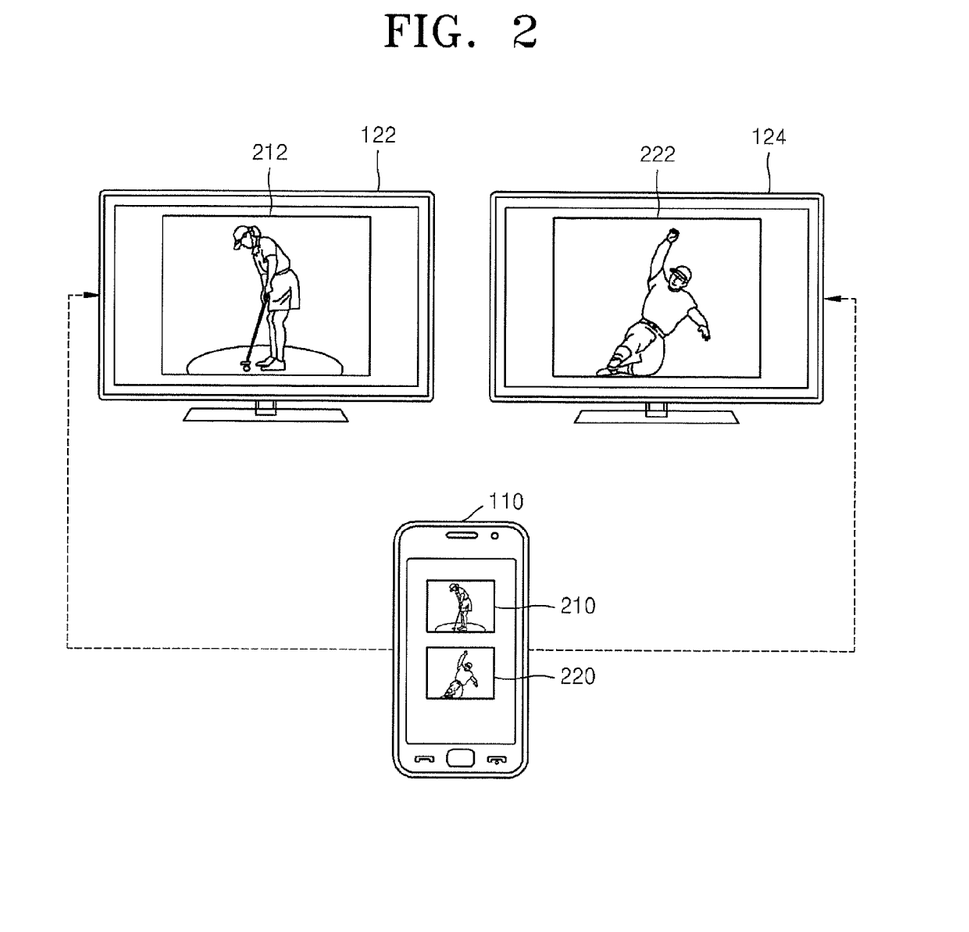
FIG. 2 illustrates how to select a device based on pieces of media data, according to an embodiment of the present disclosure.

FIG. 2 illustrates how to select a device based on the pieces of media data, according to an embodiment of the present disclosure.

Referring to FIG. 2, the first device 110 maps a plurality of images 210 and 220 to the plurality of second devices 120 one-to-one, and then displays the plurality of images 210 and 220 on the screen of the first device 110. The plurality of images 210 and 220 are each transmitted to one of the plurality of second devices 120, and the plurality of second devices 120 each display the received image 212 or 222 on their screens.

Instead of mapping user-unfriendly information about the devices, intuitively perceivable images are mapped to the plurality of second devices 120 and then displayed on their screens, respectively. Accordingly, the user of the first device 110 may select at least one of the second devices 120 to be accessed by selecting at least one of the images 210 and 220 being displayed on the screen of the first device 110.

Figure 3:
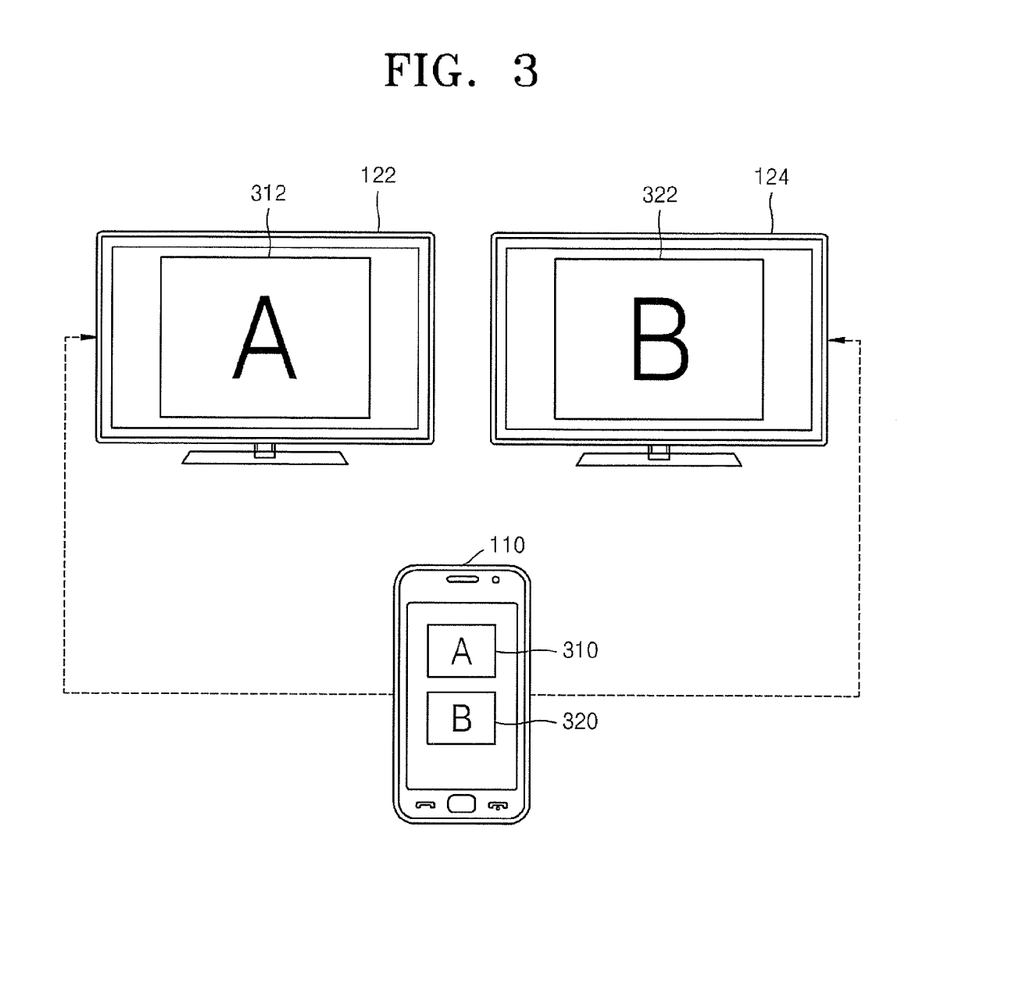
FIG. 3 illustrates how to select a device based on pieces of media data, according to another embodiment of the present disclosure.

FIG. 3 illustrates how to select a device based on the pieces of media data, according to another embodiment of the present disclosure.

Referring to FIG. 3, the first device 110 maps a plurality of text images 310 and 320 to the plurality of second devices 120 one-to-one, and displays them on the screen of the first device 110. The first device 110 transmits the plurality of text images 310 and 320 to corresponding second devices 120 one-to-one, and the second devices 120 each display one of the received texts 312 and 322 on their screens.

The user of the first device 110 may select at least one device to be accessed by selecting at least one of the plurality of text images 310 and 320 being displayed on the screen of the first device 110.

Referring back to FIG. 1, when the selection of the at least one device to be accessed has been performed in operation 134, the first device 110 accesses the device selected in operation 134, in operation 135. The first device 110 may then use a service provided by the device selected in operation 134, or provide the device selected in operation 134 with a service. Taking an example of the foregoing photo display service, the first device 110, which is a mobile device, may transmit photos stored therein to the second device #1 122, which is a television.

Figure 4:
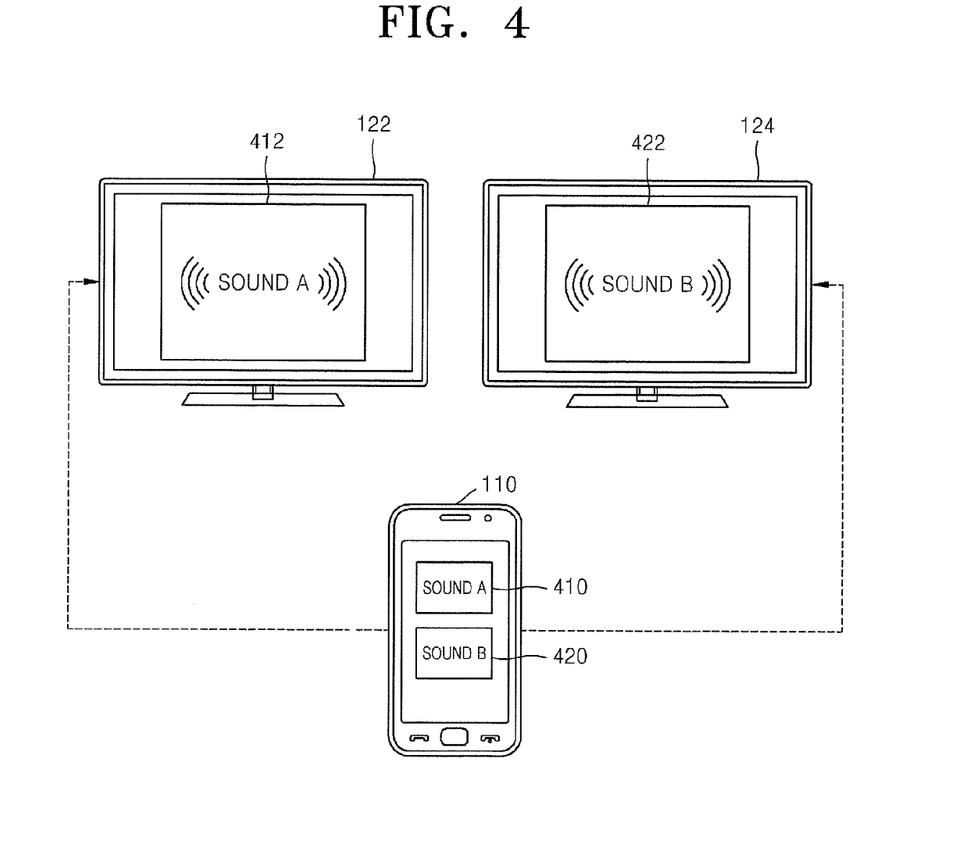
FIG. 4 illustrates how to select a device based on pieces of media data, according to yet another embodiment of the present disclosure.

FIG. 4 illustrates how to select a device based on the pieces of media data, according to another embodiment of the present disclosure.

Referring to FIG. 4, the first device 110 maps a plurality of sounds 410 and 420 to the plurality of second devices 120 one-to-one, and then displays on its screen selection items for selecting the plurality of sounds 410 and 420 and reproduces the plurality of sounds 410 and 420. The first device 110 may reproduce the plurality of sounds 410 and 420 one-by-one in predetermined order, because reproducing the sounds 410 and 420 simultaneously makes it difficult for the user to distinguish the sounds 410 and 420 from one another. In addition, separate reproducing option items may be displayed on the screen independently from the selection items of the plurality of sounds 410 and 420, and when the user selects a reproducing option item, a second device corresponding to the selected reproducing option item may reproduce the sound. The reproducing option items may each be set for one of the plurality of sounds 410 and 420.

The first device 110 transmits the plurality of sounds 410 and 420 to the plurality of second devices 120 one-to-one, and the plurality of second devices 120 each reproduce one of the received plurality of sounds 410 and 420. The plurality of second devices 120 may each reproduce one of the plurality of sounds 410 and 420 one-by-one in predetermined order as in the first device 110, because reproducing the plurality of sounds 410 and 420 simultaneously in the plurality of second devices 120 makes it difficult for the user to tell the sounds from one another. For example, the second device #1 122 first reproduces sound A, and when the second device #1 122 completes the reproduction of sound A, the second device #2 124 starts reproducing sound B.

The user of the first device 110 compares the plurality of sounds 410 and 420 being reproduced therein with the plurality of sounds being reproduced by the plurality of the second devices 120 to select at least one of the plurality of second devices 120 to be accessed. The user may select at least one of the plurality of devices 120 to be accessed by selecting at least one of the selection items corresponding to the plurality of sounds 410 and 420 being displayed on the screen of the first device 110.

Figure 5:
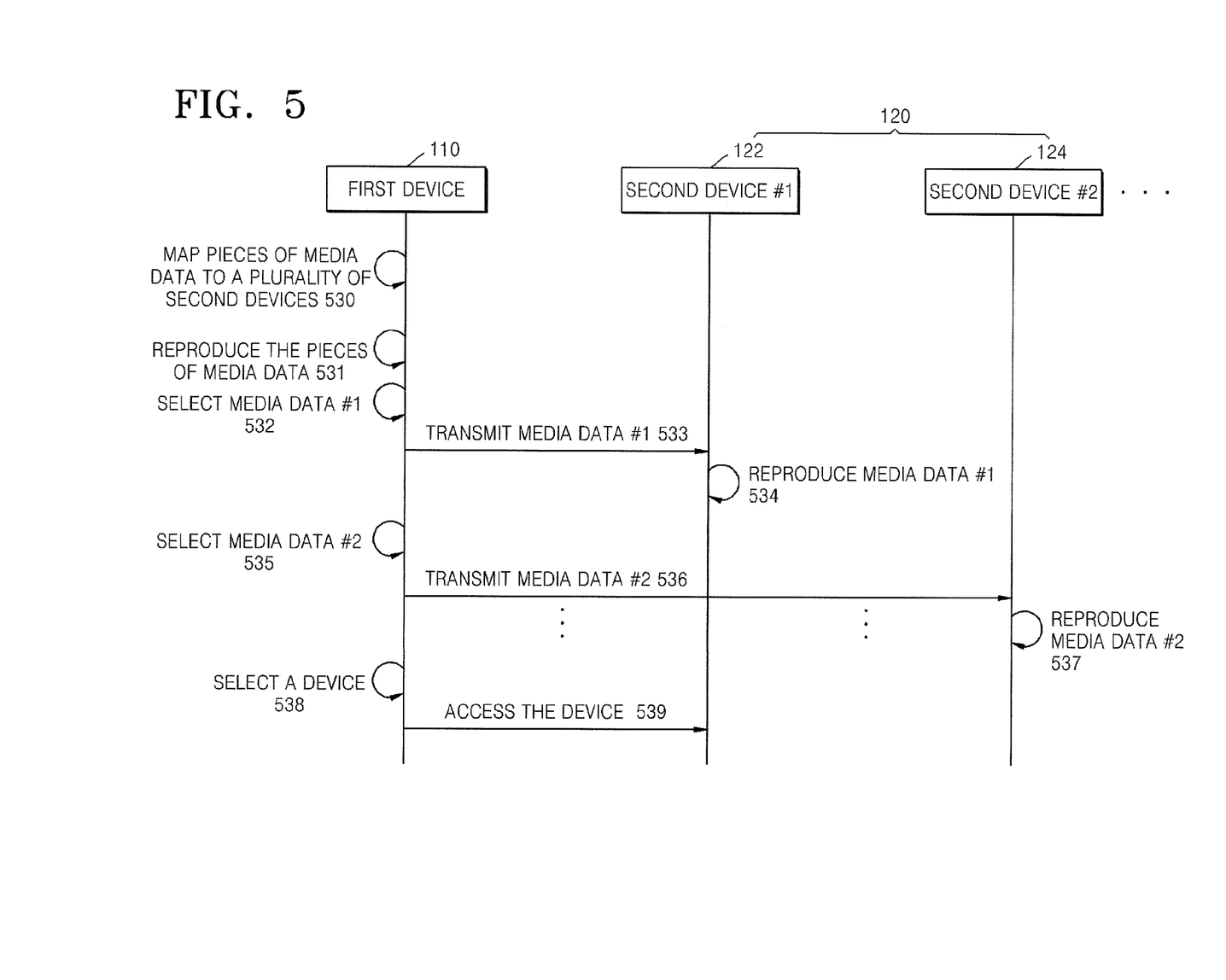
FIG. 5 is a flowchart of a method of a first device for accessing at least one second device, according to another embodiment of the present disclosure.

FIG. 5 is a flowchart of a method of the first device 110 for accessing one of the second devices 120, according to another embodiment of the present disclosure.

Referring to FIG. 5, in operation 530, the first device 110 maps the pieces of media data to the plurality of the second devices 120, as in operation 130 of FIG. 1.

In operation 531, the first device 110 reproduces the pieces of media data that have been mapped in operation 530, as in operation 131 of FIG. 1.

In operation 532, the first device 110 selects one of the pieces of media data being reproduced in operation 531. For example, the first device 110 may select media data #1 from among the pieces of media data. The first device 110 may select the media data #1 from among a plurality of images or text being displayed as in operation 531 on its screen in the form of thumbnails. Further, when the media data are sounds, the first device 110 may select a selection item corresponding to the media data #1 from among the plurality of selection items each corresponding to one of the plurality of sounds.

In operation 533, the first device 110 transmits the media data #1 selected in operation 532 to the second device #1 122 that has been mapped in operation 530 to the media data #1.

In operation 534, the second device #1 122 reproduces the media data #1. The second device #1 122 displays on its screen an image or a text received in operation 533, or reproduces a sound received in operation 533.

The user of the first device 110 identifies the reproducing results of operation 534, and if he/she finds that the second device #1 122 is to be accessed, then the user selects the media data #1 to select the second device #1 122 to be accessed, in operation 538. Otherwise, if the user finds that the second device #1 122 is not to be accessed, he/she selects other media data, in operation 535. Even if the second device #1 122 is identified as the device to be accessed, when there are more devices to be accessed, subsequent operations 535 to 537 may be performed.

When media data #2 is selected in operation 535, the first device 110 transmits the media data #2 to the second device #2 124 in operation 536.

In operation 537, the second device #2 124 reproduces the media data #2. The second device #2 may display an image or a text received in operation 536 on its screen, or may reproduce a sound received in operation 533.

If the user of the first device 110 determines from the reproducing results of operation 537 that the second device #2 124 is not the device to be accessed, the foregoing operations of selecting, transmitting, and reproducing media data may be repeated. However, if the user determines that the second device #2 124 is the device to accessed, the method goes to operation 538 where the user selects the second device #2 124 to be accessed.

In operation 558, the first device 110 selects at least one device to be accessed based on operations 523 to 537, as in operation 134 of FIG. 1. This will be described in more detail with reference to FIGS. 6A and 6B.

Figure 6A:
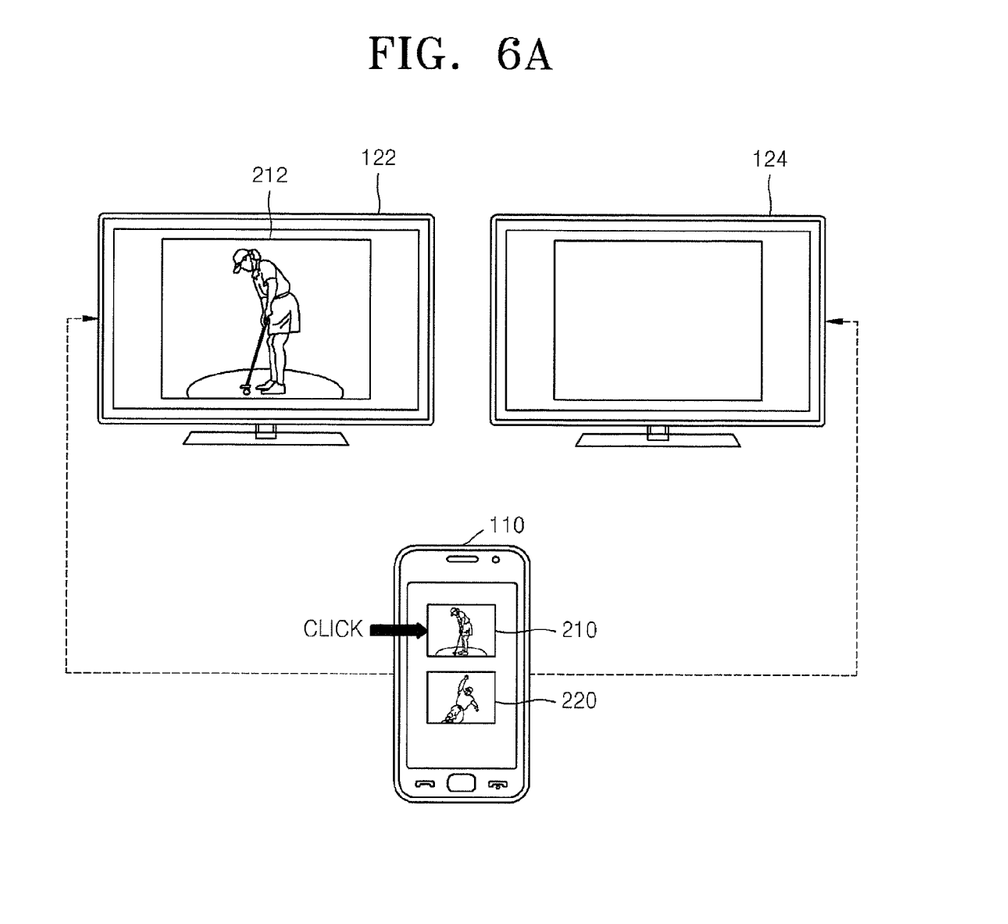
FIGS. 6A and 6B illustrate how to select a device based on pieces of media data, according to another embodiment of the present disclosure.
Figure 6B:
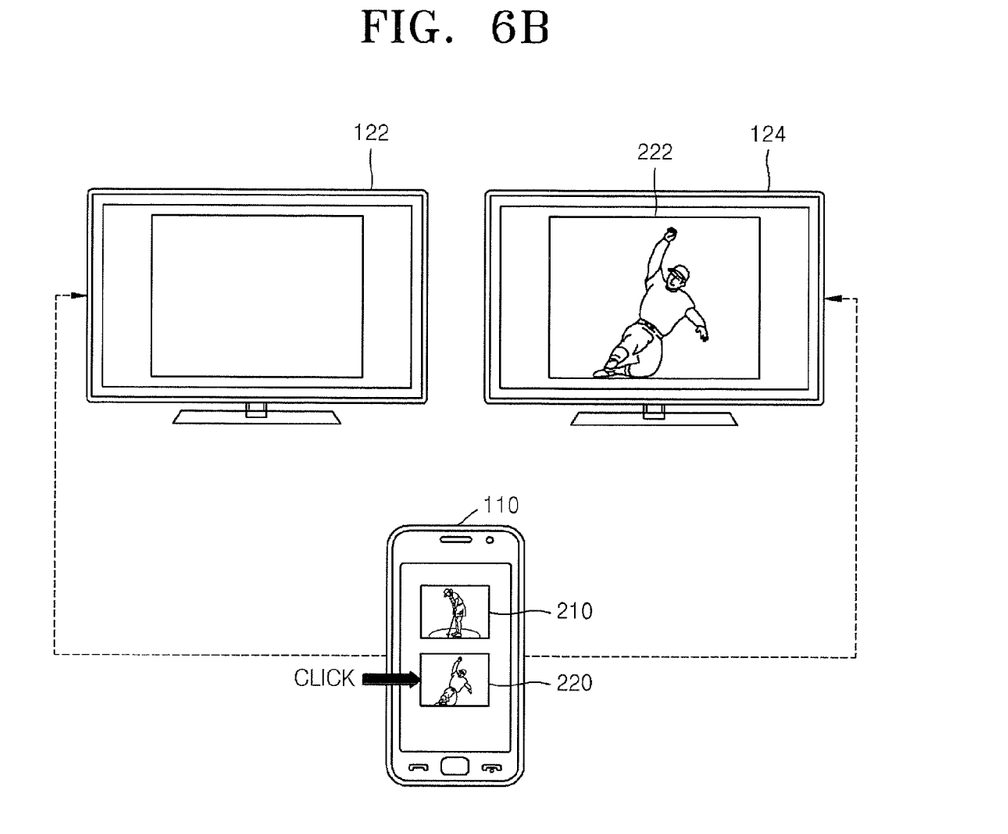

FIGS. 6A and 6B illustrate how to select a device based on the pieces of media data, according to another embodiment of the present disclosure.

Referring to FIG. 6A, the first device 110 maps the plurality of images 210 and 220 to the plurality of second devices 120 one-to-one, and then displays the plurality of images 210 and 220 on its screen. In comparison with the embodiment described with reference to FIG. 2, the plurality of images 210 and 220 are only displayed on the screen of the first device 110 while no image is displayed on a screen of any of the second devices #1 and #2 122 and 124 until the user selects any of the second devices #1 and #2 122 and 124.

When the user of the first device 110 selects (e.g., by clicking) an upper image 210 on the screen of the first device 110, the same image 212 as the upper image 210 is displayed on the screen of the second device #1 122. By identifying the screen of the second device #1 122, the user of the first device 110 may figure out that the upper image 210 being displayed on the screen of the first device 110 has been mapped to the second device #1 122.

Similarly, referring to FIG. 6B, when the user of the first device selects (e.g., by clicking) a lower image 220 on the screen of the first device 110, the same image 222 as the lower image 210 is displayed on the screen of the second device #2 124. By identifying the screen of the second device #2 124, the user may figure out that the lower image 220 being displayed on the screen of the first device 110 has been mapped to the second device #2 124.

Although, in FIGS. 6A and 6B, images have been taken as an example of the media data, one of the ordinary skill in the art would readily know that the method described with reference to FIGS. 6A and 6B can also be applied for other media data, such as text or sounds, to be selectively reproduced by the second device 122 or 124.

The user may select at least one of the second devices 122 and 124 to be accessed based on the user's selection, as illustrated in FIGS. 6A and 6B, and the media data being reproduced by the plurality of second devices 120. The user may select the at least one of the second devices 122 and 124 by selecting the media data again or clicking one of device selection items different from media data selection items. For example, aside from the images displayed on the screen of the first device 110, as shown in FIGS. 6A and 6B, buttons for selecting devices are additionally displayed on the screen of the first device 110 while one of the images that has been selected is being displayed in one of the second devices 120, so that one of the buttons may be clicked for selecting one of the second devices 122 and 124 to be accessed. By clicking the button to select a device, the device currently reproducing the media data is selected to be accessed.

Furthermore, according to another embodiment of the disclosure, upon retrieving all devices connected and accessible to the first device 110, all of the devices accessible to the first device 110 are displayed on the screen of the first device 110. When at least one device is selected on the screen of the first device 110, a predetermined indicator is transmitted to and output from the selected device. The indicator should be interpreted broadly, including any information that may be mapped to the selected device one-to-one.

Ways of outputting the indicator vary depending on the indicator's type. That is, for a text or image indicator, the text or image may be displayed on the screen of the selected device; for a sound indicator, the sound may be delivered to a user through a speaker of the selected device.

Figure 7:
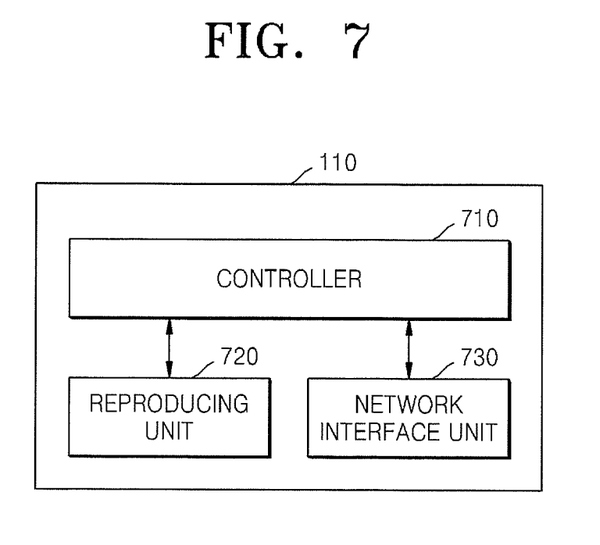
FIG. 7 is a block diagram of a first device according to an embodiment of the present disclosure.

FIG. 7 is a block diagram of the first device 110 according to an embodiment of the present disclosure.

Referring to FIG. 7, the first device 110 includes a controller 710, a reproducing unit 720, and a network interface unit 730.

The controller 710 maps pieces of media data to the plurality of the second devices 120 one-to-one. As described above in connection with operations 130 of FIGS. 1 and 530 of FIG. 5, a plurality of images, texts, or sounds are mapped to the plurality of second devices 120. The pieces of media data to be mapped may be received from an external device, or be currently stored in the first device 110.

The controller 710 retrieves the pieces of media data from a plurality of second devices 120 via a network that the first device 110 may provide a service thereto via the network interface unit 730 or the first device 110 may use services therefrom, and maps the pieces of media data to the plurality of second devices 120 after making network connections to the plurality of second devices 120.

Upon completing the mapping, the controller 710 transmits the pieces of media data to the plurality of second devices 120 one-to-one. As describe above in connection with operation 132 of FIG. 1, the controller 710 may simultaneously transmit the pieces of media data to the corresponding second devices 120 one-to-one, or as described in connection with operations 532 to 537, the controller 710 may transmit the pieces of media data to the corresponding second devices 120 in an order based on the user's selection. The controller 710 transmits the pieces of media data through the network interface unit 130.

The reproducing unit 720 reproduces the pieces of media data that have been mapped to the plurality of second devices 120. The reproducing unit 720 may display a plurality of images or texts on the screen of the first device 110, or may reproduce a plurality of sounds while displaying on the screen of the first device 110 selection items that correspond to the plurality of sounds. With a certain codec, the reproducing unit 720 may decode and reproduce encoded images or sounds.

Figure 8:
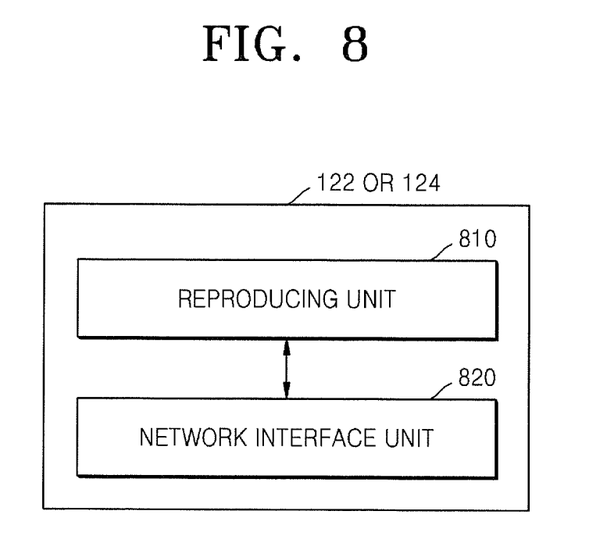
FIG. 8 is a block diagram of a second device according to an embodiment of the present disclosure.

FIG. 8 is a block diagram of one of the second devices 120, according to an embodiment of the present disclosure.

Referring to FIG. 8, the second device 122 or 124 includes a reproducing unit 810 and a network interface unit 820.

The network interface unit 820 receives media data that has been mapped to the second device 122 or 124 by the first device 110, and the reproducing unit 810 reproduces the received media data. The reproducing unit 810 displays a received image or a text on the screen of the second device 122 or 124, or reproduces a received sound. With a predetermined codec, the reproducing unit 810 may reproduce an encoded image or sound.

Each of the devices shown in FIGS. 7 and 8, according to the exemplary embodiments of the present disclosure, may include buses coupled to each element of the devices and at least one processor coupled to the buses, and may further include a memory coupled to the buses and the at least one processor for storing instructions, received messages, or created messages therein and allowing the at least one processor to implement the instructions as described above.

A program for carrying out the exemplary embodiments of the present disclosure may be implemented as computer-readable codes on a computer-readable storage medium. Examples of the computer-readable storage medium include all kinds of storage devices which can be read by a computer system. The computer-readable storage medium comprises, for example, a read only memory (ROM), a random access memory (RAM), a compact disk-ROM (CD-ROM), a magnetic tape, a floppy disk, an optical data storage device, and so on. The computer-readable storage medium can also be distributed to a computer system connected to a network to be stored and executed as computer-readable program codes.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method associated with a first device for accessing at least one of a plurality of second devices connected to the first device, the method comprising:

reproducing a plurality of media data in the first device, each media data is to be reproduced in at least one of the plurality of second devices;

transmitting first media data of the plurality of media data to a device of the plurality of second devices and transmitting second media data of the plurality of media data to another device of the plurality of second devices;

determining at least one of the plurality of second devices to be accessed by the first device according to a user's selection on the basis of the plurality of media data being reproduced by both the first device and each of the plurality of second devices; and accessing the determined at least one of the plurality of second devices.

2. The method of claim 1, wherein the plurality of media data comprise a plurality of images that each correspond to one of the plurality of second devices.

3. The method of claim 2, wherein the reproducing in the first device comprises displaying the plurality of images that each correspond to one of the plurality of second devices on a screen of the first device as thumbnail images.

4. The method of claim 1, wherein the plurality of media data comprise a plurality of sounds or text images each corresponding to one of the plurality of second devices.

5. The method of claim 1, wherein the reproducing in the first device comprises:

mapping the plurality of media data stored in the first device to the plurality of the second devices one-to-one; and reproducing in the first device the plurality of media data stored in the first device.

6. The method of claim 1, wherein the reproducing in the first device comprises:

mapping the plurality of media data received from an external device to the plurality of the second devices one-to-one; and reproducing in the first device the plurality of media data received from the external device.

7. The method of claim 1, wherein the reproducing in the first device comprises reproducing the plurality of media data one-by-one in a predetermined order, wherein the plurality of second devices reproduce the plurality of media data in the predetermined order.

8. An accessing apparatus of a first device for accessing a plurality of second devices connected to the first device, the apparatus comprising:

a reproducing unit configured to reproduce a plurality of media data in the first device, each media data is to be reproduced in at least one of the plurality of second devices;

a network interface unit configured to transmit first media data of the plurality of media data to a device of the plurality of second devices and transmit second media data of the plurality of media data to another device of the plurality of second devices;

a controller configured to determine at least one of the plurality of second devices to be accessed by the first device according to a user's selection on the basis of the plurality of media data being reproduced by both the first device and each of the plurality of second devices, and access the determined at least one of the-plurality of second devices.

9. The apparatus of claim 8, wherein the plurality of media data comprise a plurality of images that each correspond to one of the plurality of second devices.

10. The apparatus of claim 9, wherein the reproducing unit displays the plurality of images that each correspond to one of the plurality of second devices on a screen of the first device as thumbnail images.

11. The apparatus of claim 8, wherein the plurality of media data comprise a plurality of sounds or text images each corresponding to one of the plurality of second devices.

12. The apparatus of claim 8, wherein the controller maps the plurality of media data stored in the first device to the plurality of the second devices one-to-one, wherein the reproducing unit reproduces in the first device the plurality of media data stored in the first device.

13. The apparatus of claim 8, wherein the controller maps the plurality of media data received from an external device to the plurality of the second devices one-to-one, wherein the reproducing unit reproduces in the first device the plurality of media data received from the external device.

14. The apparatus of claim 8, wherein the reproducing unit reproduces the plurality of media data one-by-one in a predetermined order, wherein the plurality of second devices reproduces the plurality of media data in the predetermined order.

15. A non-transitory computer-readable storage medium encoded with computer-executable instructions that when executed cause a data processing system to perform the steps of:

reproducing a plurality of media data in the first device, each media data is to be reproduced in at least one of the plurality of second devices;

transmitting first media data of the plurality of media data to a device of the plurality of second devices and transmitting second media data of the plurality of media data to another device of the plurality of second devices;

determining at least one of the plurality of second devices to be accessed by the first device according to a user's selection on the basis of the plurality of media data being reproduced by both the first device and each of the plurality of second devices; and accessing the determined at least one of the plurality of second devices.

16. The non-transitory computer-readable storage medium of claim 15, wherein the plurality of media data comprise a plurality of images that each correspond to one of the plurality of second devices.

17. The non-transitory computer-readable storage medium of claim 16, wherein the reproducing in the first device comprises displaying the plurality of images that each correspond to one of the plurality of second devices on a screen of the first device as thumbnail images.

18. The non-transitory computer-readable storage medium of claim 15, wherein the plurality of media data comprise a plurality of sounds or text images each corresponding to one of the plurality of second devices.

19. The non-transitory computer-readable storage medium of claim 15, wherein the reproducing in the first device comprises:

mapping the plurality of media data stored in the first device to the plurality of the second devices one-to-one; and reproducing in the first device the plurality of media data stored in the first device.

* * * * *